W. H. SIMONSON AND O. MANTIUS.
PROCESS FOR RECLAIMING SLUDGE ACID IN PETROLEUM REFINING.
APPLICATION FILED NOV. 19, 1920.
1,384,978.
Patented July 19, 1921.
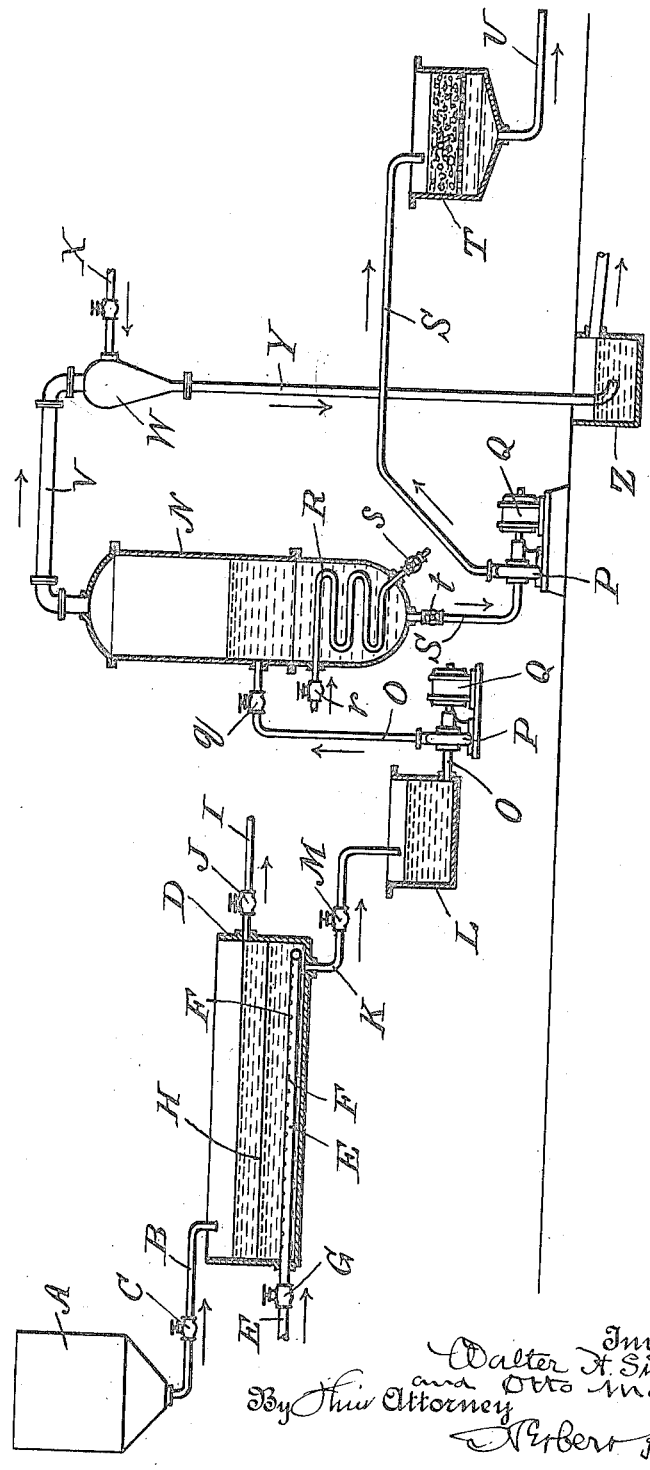
Inventors
Walter H. Simonson
and Otto Mantius
By their Attorney
Herbert Knight

UNITED STATES PATENT OFFICE.

WALTER H. SIMONSON, OF BROOKLYN, NEW YORK, AND OTTO MANTIUS, OF ENGLEWOOD, NEW JERSEY.

PROCESS FOR RECLAIMING SLUDGE ACID IN PETROLEUM REFINING.

1,384,978.   Specification of Letters Patent.   Patented July 19, 1921.

Application filed November 19, 1920. Serial No. 425,162.

*To all whom it may concern:*

Be it known that we, WALTER H. SIMONSON, a citizen of the United States of America, residing in the borough of Brooklyn, city of New York, county of Kings, and State of New York, and OTTO MANTIUS, formerly a subject of the Emperor of Germany, whose first papers for citizenship of the United States of America have been granted and whose second papers have been filed, and who at present resides at Englewood, New Jersey, have invented a new and useful Process for Reclaiming Sludge Acid in Petroleum Refining, of which the following is a specification.

In the refining of oil (petroleum) the oil is treated in a large vessel called an agitator by the addition of sulfuric acid. The acid has a cleansing effect on the oil and removes a large part of the hydrocarbons from the oil as well as combining with any water which the oil might contain. After agitation of the oil and acid in the vessel they are allowed to settle and the cleansed oil is drawn off. The residue called a sludge acid, (containing tar, acid, oil, water and other foreign matter) is then drawn off and thrown away in most instances. Where an attempt is made to recover the acid the sludge is treated with either hot water, or live steam, in a separating tank and the acid density reduced to 28°–35° Bé. This dilution and boiling will separate the hydrocarbons and the acid into two layers and after settling the hydrocarbons can be floated off at the top and the weak sulfuric acid with some carbons is drawn off from the bottom into a storage tank.

At the present time there are two systems of acid concentrating in use by the larger refineries. Both of these systems encounter disadvantages in concentrating or handling the sludge acid. The most common process of recovering waste acids from the oil refining process consists of the following steps. After the sludge acid is diluted with steam and separated from the hydrocarbons it is concentrated to a density of about 60° Bé. in open pans made of lead, heated from the bottom or top. The further concentration is then effected in special cast iron vessels heated by direct heat from the bottom.

The disadvantages of this process, as far as the concentration of the acid is concerned, are mainly due to the high temperatures necessary for the evaporation of the water from the acid. The boiling point gradually rises to about 500° F. at which temperature the carbon matter is burned, or distilled off, and produces some very bad odors which make it impossible to locate such a plant in the neighborhood of cities and villages. Also the high temperatures will cause a considerable discoloration of the acid and the whole installation is very expensive in first cost and operation, as the lead pans and iron pots require very large surfaces in contact with the hot gases. Fuel economy is very poor on account of the high boiling point of the acid, as the gases have to be discharged at high temperatures.

Another process is to take the diluted acid and feed same over the top of a tower which is packed with brick, coke or some other substance which allows the acid to be finely divided in its passage down the tower. Hot gas enters the tower at the bottom and evaporation of the water contained in the acid is effected in this way. Sludge acid contains a large portion of foreign matter held in suspension and will clog up the packing in a tower system in a very short time, rendering the system useless and necessitating the repacking of the towers which is a tedious and expensive operation.

Both of the systems now in use are expensive to install and operate and for that reason only the largest of refineries can install and operate them profitably. Perhaps ninety per cent. of the refineries in this country make no attempt at acid recovery and would welcome any system that could be installed at reasonable cost to operate economically. At the present time their sludge acid is a waste product and they meet with great difficulty in disposing of it as a waste. If it is turned into sewers, eventually they will be destroyed. It contaminates water supply and navigable streams and frequently ruins underground pipe lines, etc. In a great many districts it is turned loose into ditches and it is a disagreeable and ill smelling nuisance as well as a fire menace.

These drawbacks and disadvantages being recognized in the art we have in our method and operation herein described engineered a means for providing a much more economic procedure, and we will now describe our method and show its advance over the prior practice.

Our process is to take the sludge acid as it comes from the agitator and run it into a separating tank where it is treated by live steam or hot water, diluting the acid to 28°–30° Bé. It is then allowed to settle and separate into two layers. The hydrocarbons, oil, water, etc. are then floated off at the top and disposed of as desired and the weak acid containing some hydrocarbons is drawn off from the bottom into a storage tank. The important step in our process now takes place. The weak acid is run into an apparatus called an evaporator working under a high vacuum where it is heated by means of steam coils. By maintaining a vacuum in the apparatus the boiling point of the acid is reduced to from 270°–290° F. whereas at ordinary atmospheric pressure the boiling point is approximately 500° F. The low boiling point of the acid employed by us in the vacuum permits the water in the acid to be evaporated off without burning the organic matter contained in the acid. By preventing the organic matter from burning, the acid is not discolored by it; also the objectionable odors thrown off in its burning, or distillation, are done away with. The steam coils of the evaporator are supplied with exhaust steam until the acid contained in the evaporator reaches a density of about 57° Bé. Live steam at a pressure of 80 to 100 lbs. or any other suitable heating medium is then introduced to the coils until the acid in the evaporator reaches a density of 64½° Bé. or even 60° Bé. if higher steam pressure is available.

The concentrated acid still containing the carbonaceous matter is then filtered through a suitable filter and the 64½° Bé. acid then is ready to be mixed with fuming sulfuric acid (oleum) so as to produce a standard acid of 66° Bé.; the 66° Bé. acid is ready for use after filtration.

We will proceed to explain our invention more particularly in connection with the accompanying drawing which illustrates one form of apparatus enabling us to carry our said invention into practical effect.

In this drawing A indicates an agitator or other point of origin of the weak acid and it is drained off by a pipe B such drainage being governed and controlled by a stop-cock C.

The pipe B discharges into a separating tank D. At E we show a pipe entering the said tank near the bottom and preferably extending all the way across, and into and through this pipe we feed live steam or hot water by means of which as hereinbefore stated, we dilute the acid to a point anywhere between 28°–30° Bé. the live steam or hot water entering the body of the acid through the perforations F in the steam pipe. A cock G governs the flow of the live steam or hot water. The resultant body settles and separates into two layers the dividing line between the layers being shown at H. Above the line H are the hydro-carbons, oil, water, etc. which are taken off through the pipe I and disposed of as desired a stop-cock J being provided to regulate this operation. The weak acid containing some hydro-carbons is then drawn off through the pipe K at the bottom of the tank discharging into a storage tank L, a cock M regulating this discharge.

From the tank L the weak acid is conveyed to the evaporator N by means of a pipe O the flow of the liquid being accelerated by the pump P operated in any suitable manner as by a motor Q. A stop-cock q is provided on the pipe O.

The evaporator N is worked under a high vacuum and it is heated by means of steam in the coils R which steam is controlled in its entrance by the cock r and the condensate is governed by the cock s. This steam is maintained at as high a point of efficiency as desired. By creating a vacuum, or partial vacuum, in the apparatus the boiling point of the acid is reached at from 270°–290° F.; at ordinary atmospheric pressure the boiling point is approximately 500° F. The low boiling point of the acid employed by us in the vacuum permits the water in the acid to be evaporated off without burning the organic matter contained in the acid as explained. As the organic matter will not be burned the acid will not be discolored and the objectionable odors are eliminated.

In carrying our invention into effect the steam coil R of the evaporator is supplied with exhaust steam until the acid contained in the evaporator reaches a density of about 57° Bé. At this point live steam at a pressure of 80 to 100 lbs., or any other suitable heating medium, is introduced in the coil R until the acid in the evaporator reaches a density of 64½° Bé. or may even reach 66° Bé. if higher steam pressure is available.

The concentrated acid resulting from the foregoing, and still retaining the carbonaceous matter, is drawn off through the pipe S discharging into a suitable filter T which extracts the carbonaceous matter and the resultant acid of approximately 64½° Bé. is drawn off through pipe U and is ready to be mixed with fuming sulfuric acid (oleum) so as to produce a standard acid of 66° Bé. In the pipe S we may provide the usual pump P and motor Q for facilitating the movement of the fluid and a cock t is provided to regulate such flow, or shut it off. The upper part of the evaporator is provided with the usual pipe V and a jet condenser is shown at W and a water pipe at X. The pipe Y leading from the condenser discharges into an overflow waste vat Z.

Regarding the cost of our system it is figured that a vacuum evaporator with condenser and other auxiliaries can be installed for from one third to one fifth the cost of the standard concentrator, and this will enable even the smallest refineries to install an economical equipment for the recovery of their waste acids. Instead of using direct heat we employ indirect heat, and in carrying this phase of our invention into effect we employ exhaust steam to concentrate the acid to 57° Bé. and live steam 80-100 pressure is used only to finish the concentration to 64½° Bé. thus reducing the fuel consumption to less than one half of the standard concentrating pans. On account of the lower temperature there is no burning of organic matter contained in the acid and should any odors be given off in the evaporator these odors will be diluted and carried off by the large amount of cooling water used in the jet condenser.

The following is an instance of what can be saved that is now going to waste. In the usual process of refining oil, two thirds of the original acid may be recovered in the weak acid of about 30° Bé. density. This weak solution is concentrated to 64.3 deg. Bé. and then mixed with about 30% by weight of fuming, sulfuric acid, containing 50% of free $SO^3$. This mixture will result in a 66° Bé. acid of the same quantity as originally employed in the process. Naturally these figures give only an instance and may vary with specific conditions at various refineries.

Having thus described our invention the following is what we claim as new and useful therein and desire to secure by Letters Patent:

1. The process for reclaiming sludge acid in petroleum refining which consists in concentrating the weak acid by subjecting it to a temperature sufficiently high to vaporize the water but low enough to prevent the combustion of organic matter, and then drawing off the acid and filtering it.

2. The process for reclaiming sludge acid in petroleum refining which consists in concentrating the weak acid by boiling the same at a temperature lower than could be done at atmospheric pressure, and then drawing off the acid.

3. The process for reclaiming sludge acid in petroleum refining which consists in concentrating the weak acid by heating the acid to a temperature approximately from 270 to 290° F. under less than atmospheric pressure thus causing the water to vaporize, and then drawing off the acid.

4. The process for reclaiming sludge acid which consists in concentrating the acid, by boiling in a partial vacuum, and then withdrawing the product.

5. The process for reclaiming sludge acid which consists in concentrating the acid by causing the same to boil in a partial vacuum through the application of indirect heat and then withdrawing the product.

WALTER H. SIMONSON.
OTTO MANTIUS.